G. W. DUNHAM AND L. C. FREEMAN.
AXLE CONSTRUCTION FOR MOTOR VEHICLES.
APPLICATION FILED JUNE 16, 1919.
1,396,102.
Patented Nov. 8, 1921.
2 SHEETS—SHEET 1.
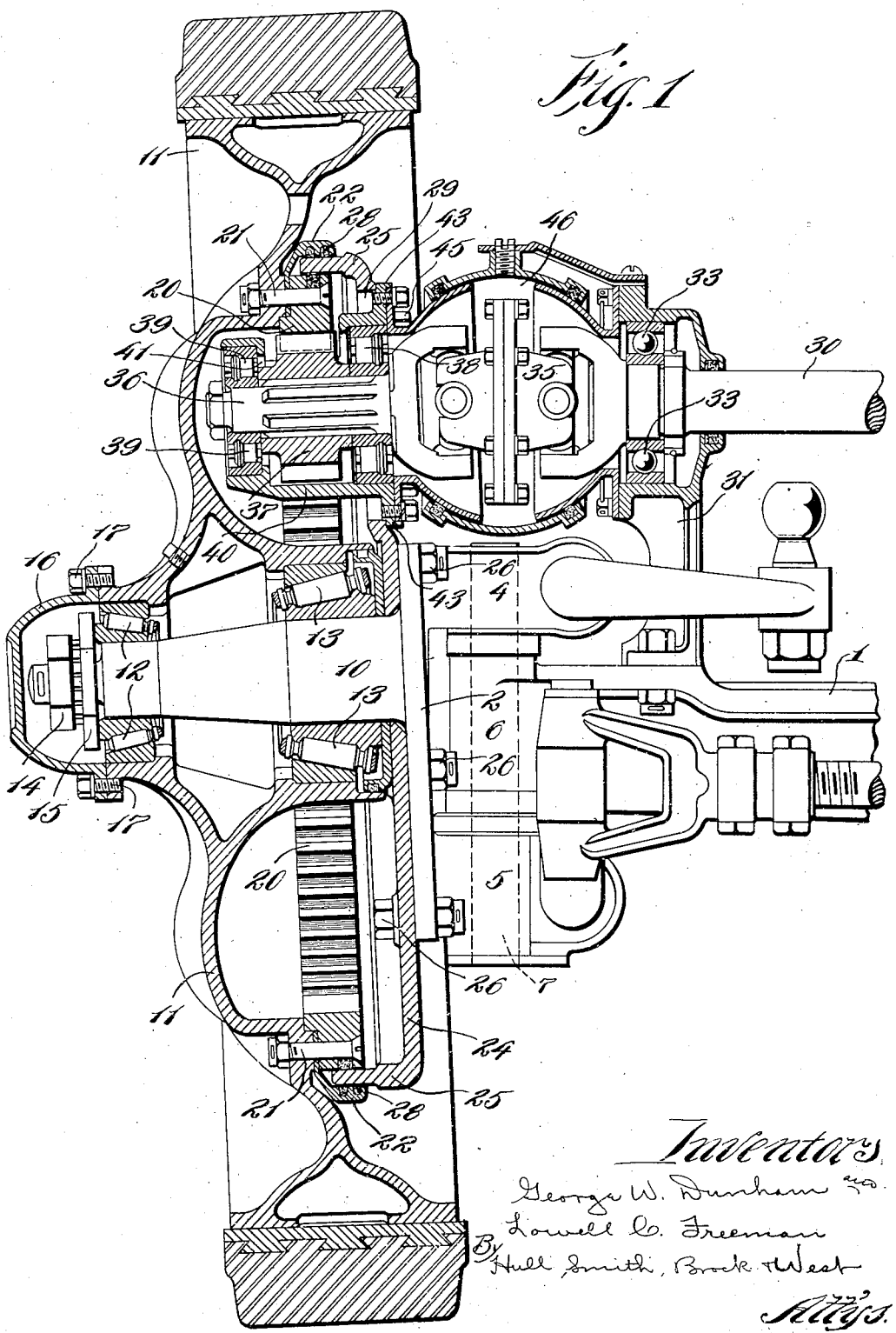

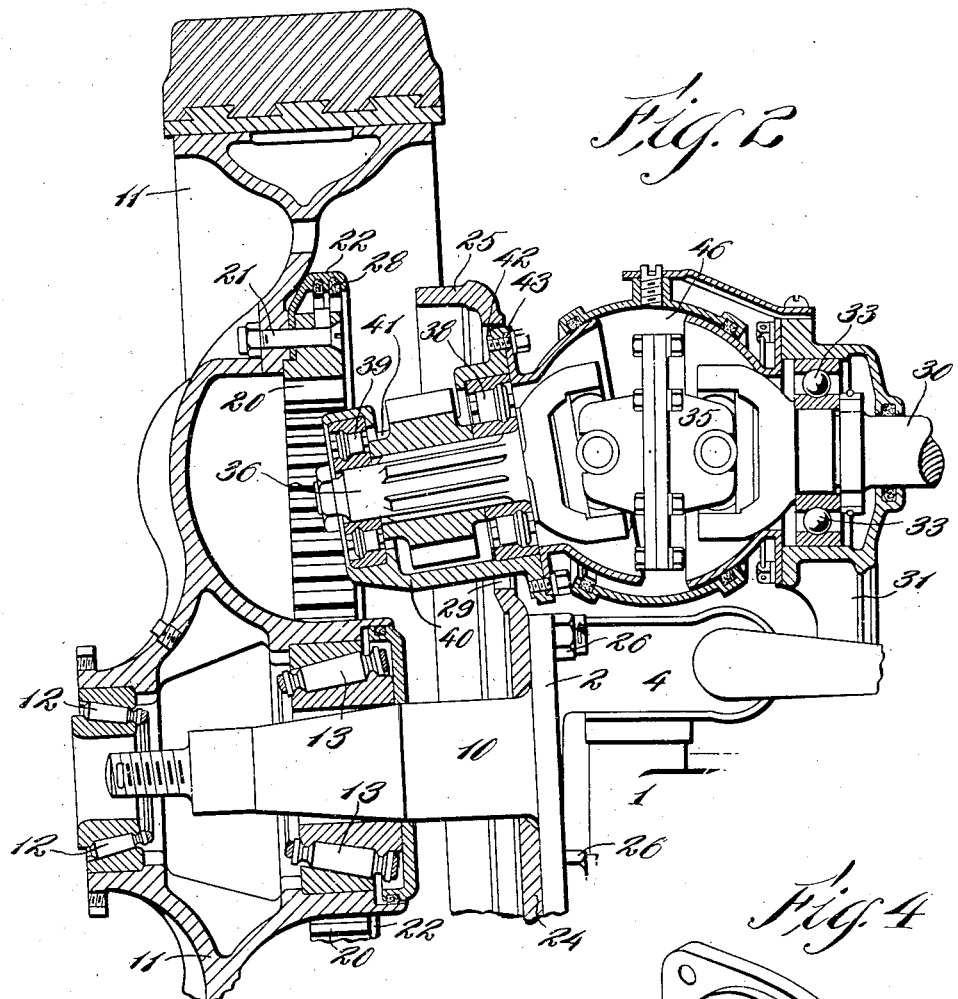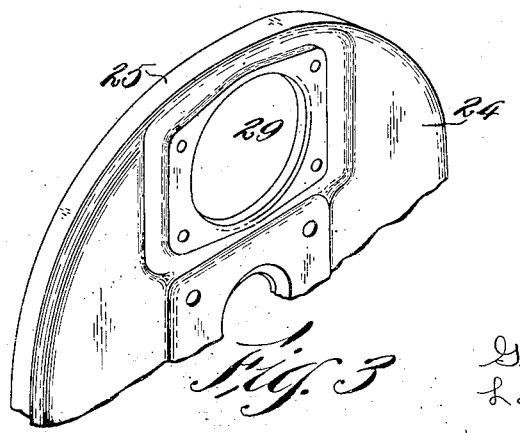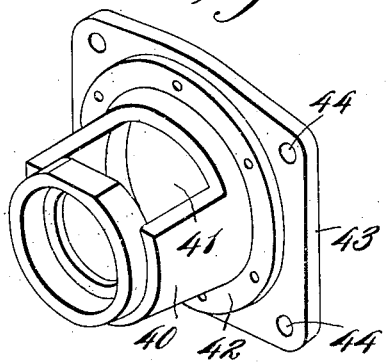

UNITED STATES PATENT OFFICE.

GEORGE W. DUNHAM AND LOWELL C. FREEMAN, OF NEW YORK, N. Y., ASSIGNORS TO THE MILITOR CORPORATION, OF NEW YORK, N. Y., A CORPORATION OF NEW YORK.

AXLE CONSTRUCTION FOR MOTOR-VEHICLES.

1,396,102.   Specification of Letters Patent.   Patented Nov. 8, 1921.

Application filed June 16, 1919. Serial No. 304,666.

*To all whom it may concern:*

Be it known that we, (1) GEORGE W. DUNHAM, and (2) LOWELL C. FREEMAN, citizens of the United States, residing at New York, in the county of New York and State of New York, have invented a certain new and useful Improvement in Axle Constructions for Motor-Vehicles, of which the following is a full, clear, and exact description, reference being had to the accompanying drawings.

This invention relates to an improved construction for that type of motor vehicle—in the class of trucks or tractors—wherein the driving wheels are equipped with gears that are driven by pinions on shafts carried by the axles. It is necessary, in order to obtain the required strength, to support the shafts at their outer ends beyond the pinions, and if the wheels are to be conveniently removable without disturbing their gears or generally dismantling the construction, it has been the custom to make the outer bearings of the shafts sufficiently small to permit the gears of the driving wheels to pass said bearings when the wheels are withdrawn from the spindles. According to this prior practice the end bearings of the shafts have been of so small an outside diameter that they have been unable to withstand the strain imposed upon them and consequently have given much trouble.

It is the object of our invention to overcome this difficulty by providing end bearings for the shafts that are of ample size to sustain the burden imposed upon them, (the demands requiring that the bearings be of a diameter greater than that of the minimum circle touched by the teeth of the gears as they interengage with those of the pinions), and by employing a construction permitting lateral displacement of the bearings beyond the scope of the gears, thus permitting the gears to pass the bearings as the driving wheels are withdrawn from the spindles.

We have illustrated in the accompanying drawings a construction through which the foregoing object is attained. Figure 1 is a sectional view of a driving wheel applied to an axle and incorporating our invention, the parts being in operative position; Fig. 2 is a fragmentary sectional view of the same parts, showing them in the position they occupy during the removal of the wheel; Fig. 3 is a fragmentary perspective view of a member through which the outer shaft bearing is indirectly supported; and Fig. 4 shows, in perspective, a cage that is designed to be removably attached to the member shown in Fig. 3, and which directly supports the outer shaft bearing.

Inasmuch as our invention pertains only to the manner of supporting the drive shaft with respect to the driving wheel, we have confined our illustrations to those parts immediately associated with the wheel mounting and driving connection. 1 is an axle which, it will be understood, is the same at each end, only one end being shown; and pivotally connected to the end is a steering knuckle 2 having bearings 4 and 5 that are disposed, respectively, above and below a vertical boss 6 of the axle. The usual knuckle pin 7, shown in dotted lines, passes through alining bores of the boss 6 and the bearings 4 and 5. The steering knuckle is provided with a spindle 10 whereon the driving wheel 11 is mounted through suitable bearings 12 and 13, the wheel being held on the spindle by the usual nut and washer 14 and 15, and these are ordinarily concealed by a cap 16 that is applied to the end of the hub and shown as secured in place by cap screws 17.

An internal gear 20, in the form of an annulus, is secured to the web of the wheel by bolts 21, and shown as clamped between the gear and web is the flange of a dust guard 22 which extends inwardly and over, and is spaced from, the periphery of the gear. A member 24, in the form of a disk, and having a peripheral flange 25, is secured, as by bolts 26, to the steering knuckle 2, the flange 25 of said member extending outwardly between the gear 20 and the dust guard 22. Packing rings 28 of the dust guard bear upon the exterior of the flange 25.

Above the steering knuckle 2, the member 24 is provided with an opening 29 that is substantially in axial alinement with a driving shaft 30. This shaft is supported from the axle 1 by a bracket 31 within the head whereof is located suitable anti-friction bearings 33. It may be explained that the inner end of the shaft 30 is connected through suitable gearing with the power plant of the vehicle, as will be readily understood by those familiar with the art. The outer end of the driving shaft, immediately beyond bracket 31, is coupled, through a suitable universal joint 35, preferably of a double character, with the inner end of a short shaft 36 that extends through the opening 29 of the member 24 into the interior of the dished web of the wheel where it has secured to it a pinion 37 that meshes with the internal gear 20. The shaft 36 is journaled within suitable bearings 38 and 39, the latter constituting the outer shaft bearing hereinbefore referred to, and these bearings are, in turn, supported within a substantial structure which I shall term a cage 40 and which is, generally of cylindrical form, its cylindrical wall being cut away at 41 to permit the intermeshing of the pinion 37 and gear 20. It will be observed, especially from Fig. 4, that, at the inner end of its cylindrical wall, the cage is provided with an annular ledge 42 of such shape and size as to fit nicely within the opening 29 of the member 24; and beyond this ledge the cage is provided with a flange 43 having apertures 44 for the accommodation of cap screws 45 that are threaded into alining apertures of the member 24.

The ledge 42 serves as a pilot to properly position the cage with respect to the member 24, and the screws 45 securely hold the parts together with the pinion meshing properly with the gear. This forms a very rigid support for the pinion shaft, it being noted that the outer bearing 39 is of generous proportions and thoroughly capable of withstanding the duty imposed upon it. In considering the diameter of this outer bearing, the outer end of the cage 40 may be included.

A suitable three part casing 46 incloses the elements of the universal joint 35, the inner and outer end members of the casing being connected, respectively, to the bracket 31 and to the flange of the cage 40.

When it is desired to remove the wheel 11, the screws 45 are taken out and the cage 40 is drawn inward sufficiently to dislodge its ledge 42 from the opening 29 of the member 24 (the shaft 30 moving inwardly sufficiently to permit of this operation) after which the cage 40 and parts carried thereby may be dropped to the position shown in Fig. 2, the casing 46 of the universal joint collapsing somewhat in the meanwhile. The outer bearing of the shaft which, in all, has the external diameter of the outer end of cage 40, is lowered beyond reach of gear 20 so that the gear may freely pass the bearing as the wheel is withdrawn from the spindle.

Having thus described our invention what we claim is:—

1. The combination, with an axle, of a wheel removably carried by the spindle of the axle, a gear secured to the wheel in concentric relation thereto, a shaft extending from beyond the inner side of the wheel through the plane of the gear, a pinion on the shaft for coöperation with the gear, and means supporting the shaft and including a bearing situated on the outside of the pinion, said bearing being of a diameter greater than that of the minimum circle concentric with the bearing and touched by the teeth of the gear as they interengage with those of the pinion, said means being shiftable laterally to remove the bearing from the path of the gear when it is desired to withdraw the wheel from the spindle.

2. The combination, with an axle, of a wheel removably carried by the spindle of the axle, a gear secured to the wheel in concentric relation thereto, a shaft extending from beyond the inner side of the wheel through the plane of the gear, a pinion on the shaft for coöperation with the gear, a member rigid with the spindle, and means sustained by said member for supporting the shaft and including a bearing situated on the outer side of the pinion, said bearing being of a diameter greater than that of the minimum circle concentric with the bearing and touched by the teeth of the gear as they interengage with those of the pinion, said means being shiftable, laterally to remove the bearing from the path of the gear when it is desired to withdraw the wheel from the spindle.

3. The combination, with an axle, of a wheel removably carried by the spindle of the axle, a gear secured to the wheel in concentric relation thereto, a sectional shaft extending from beyond the inner side of the wheel through the plane of the gear, a flexible joint connecting the sections of the shaft, a pinion on the outer section of the shaft for coöperation of the gear, means supporting the inner section of the shaft, a member rigid with the spindle, and means carried by said member for supporting the outer section of the shaft and including a bearing situated on the outer side of the pinion, said bearing being of a diameter greater than that of the minimum circle, concentric with the bearing and touched by the teeth of the gear as they interengage with those of the pinion, said means being shiftable laterally to remove the bearing from the path of the gear when it is desired to withdraw the wheel from the spindle.

4. The combination, with an axle, of a wheel removably carried by the spindle of the axle, a gear secured to the wheel in concentric relation thereto, a shaft extending from beyond the inner side of the wheel through the plane of the gear, a pinion on the shaft for coöperation with the gear, a member rigid with the spindle, an element sustained thereby for supporting the shaft and including a bearing situated on the outer side of the pinion, said bearing being of a diameter greater than that of the minimum circle concentric with the bearing and touched by the teeth of the gear as they interengage with those of the pinion, said element and member having parts coöperating to properly position the element with respect to the member, and means for detachably connecting the element to the member whereby the element may be shifted with respect to the member to remove the bearing from the path of the gear when it is desired to withdraw the wheel from the spindle.

5. The combination, with an axle, of a wheel removably carried by the spindle of the axle, a gear secured to the wheel in concentric relation thereto, a shaft extending from beyond the inner side of the wheel through the plane of the gear, a pinion on the shaft for coöperation with the gear, a member rigid with the spindle, said member having an aperture, an element having a positioning part that is piloted within said aperture, said element including a bearing for the outer end of the shaft that is situated beyond the outer side of the pinion, said bearing being of a diameter greater than that of the minimum circle concentric with the bearing and touched by the teeth of the gear as they interengage with those of the pinion, means for removably supporting the element in fixed relation to the member with its positioning part engaged within the aperture of said member, whereby said element may be disengaged from said member and shifted laterally to remove the bearing from the path of the gear when it is desired to withdraw the wheel from the spindle.

6. The combination, with an axle, of a wheel removably carried by the spindle of the axle, a gear secured to the wheel in concentric relation thereto, a shaft extending from beyond the inner side of the wheel through the plane of the gear, a pinion on the shaft for coöperation with the gear, a member rigid with the spindle, said member having an aperture, an element having a part adapted to be extended outwardly through the aperture and including also a flange for attachment to the inner side of said member, the element including a positioning part adjacent its flange that is piloted within the aperture, means for detachably securing the flange to the member, the element incorporating a bearing for the shaft that is situated on the outer side of the pinion.

7. The combination of an axle, a steering knuckle pivoted to the end thereof, a wheel removably carried by the spindle of the steering knuckle, a gear secured to the wheel in concentric relation thereto, a sectional shaft extending from beyond the inner side of the wheel through the plane of the gear, a pinion on the outer section of the shaft for coöperation with the gear, means for supporting the inner section of the shaft from the axle, a flexible joint connecting the sections of the shaft, a member rigid with the steering knuckle and having an aperture substantially in axial alinement with the inner shaft section, an element insertible through the aperture from the inner side of the member, said element having a positioning part piloted within the aperture of the member, means for detachably connecting the element to the member, the element incorporating bearings for the outer shaft section situated respectively on the inner and outer sides of the pinion.

8. The combination of an axle, a steering knuckle pivoted to the end of the axle, a wheel removably carried by the spindle of the steering knuckle, an internal gear secured to the wheel in concentric relation thereto, a sectional shaft extending from beyond the inner side of the wheel through the plane of the gear, supporting means for the inner shaft section, a flexible joint connecting the sections of the shaft and situated approximately on the axis of the pivotal connection between the axle and the steering knuckle, a pinion on the outer section of the shaft for coöperation with the internal gear, a member rigid with the steering knuckle and serving as an inclosure for the internal gear, the wheel having parts coöperating with said member to constitute a dust excluding joint between the wheel and member, said member having an aperture substantially in axial alinement with the inner section of the shaft, a cage adapted to be projected through the aperture of the member from the inner side thereof and having a positioning part piloted within said aperture, means detachably connecting the cage and member, the cage incorporating bearings disposed on the inner and outer sides of the pinion and wherein the outer section of the shaft is journaled, and a casing inclosing the flexible joint and comprising inner and outer sections that are supported, respectively, from the supporting means for the inner shaft section and by the inner end of the cage.

9. The combination of an axle, a steering knuckle pivoted to the end of the axle, a wheel removably carried by the spindle of the steering knuckle, an internal gear secured to the wheel in concentric relation thereto, a member secured to the steering knuckle and inclosing the gear, a dust guard carried by the wheel for coöperation with the peripheral portion of said member, said member having an aperture, a sectional shaft extending from beyond the inner side of the wheel through the aperture of said member and through the plane of the internal gear, a flexible joint connecting the sections of the shaft and situated substantially on the axis of the pivotal connection between the axle and steering knuckle, an element insertible through the aperture of the aforesaid member from the inner side thereof, said member having a positioning part piloted within the aperture, means detachably connecting said element to the member, the element incorporating bearings for the outer section of the shaft that are situated, respectively, on the inner and outer sides of the pinion, a bracket carried by the axle and within which the outer end of the inner shaft section is journaled, and a casing for the aforesaid flexible joint, said casing comprising inner and outer sections that are secured, respectively, to the said bracket and to the inner end of the aforesaid element.

10. The combination of an axle, a steering knuckle pivoted to the end of the axle, a wheel removably carried by the spindle of the steering knuckle, an internal gear secured to the wheel in concentric relation thereto, a sectional shaft extending from beyond the inner side of the wheel through the plane of the gear, a flexible joint connecting the sections of the shaft, a pinion on the outer section of the shaft for coöperation with the internal gear, a removable member rigid with the steering knuckle and serving as an inclosure for the internal gear, the wheel having parts coöperating with said member to constitute a dust excluding joint between the wheel and member, said member having an aperture substantially in axial alinement with the inner section of the shaft, an element adapted to be projected through the aperture of the member, and means detachably connecting said element and member, the element incorporating bearings that are spaced longitudinally f the outer section of the shaft, said bearings being situated respectively on the inner and outer sides of the aforesaid pinion.

11. The combination of an axle, a steering knuckle pivoted to the end of the axle, a wheel removably carried by the spindle of the steering knuckle, an internal gear secured to the wheel in concentric relation thereto, a member secured to the steering knuckle and inclosing the gear, a dust guard carried by the wheel for coöperation with the peripheral portion of said member, said member having an aperture, a sectional shaft extending from beyond the inner side of the wheel through the aperture of said member and through the plane of the internal gear, a flexible joint connecting the sections of the shaft, an element insertible through the aperture of the aforesaid member, and means detachably connecting said element to the member, the element incorporating bearings for the outer section of the shaft that are situated respectively on the inner and outer sides of the pinion.

In testimony whereof, we hereunto affix our signatures in the presence of two witnesses.

GEORGE W. DUNHAM.
LOWELL C. FREEMAN.

Witnesses:
  H. A. GODDARD,
  J. M. HOLLETT.